US005990944A

United States Patent [19]

Abe

[11] Patent Number: 5,990,944

[45] Date of Patent: Nov. 23, 1999

[54] STREAK TUBE SWEEPING METHOD AND A DEVICE FOR IMPLEMENTING THE SAME

[75] Inventor: Shigeru Abe, Hamamatsu, Japan

[73] Assignee: Hamamatsu Photonics K.K., Shizuoka-ken, Japan

[21] Appl. No.: 08/896,951

[22] Filed: Jul. 18, 1997

[30] Foreign Application Priority Data

Jul. 19, 1996 [JP] Japan .................................... 8-190897

[51] Int. Cl.[6] ............................ H01J 31/50; H04N 5/228

[52] U.S. Cl. .......................... 348/215; 348/217; 348/325; 250/214 VT; 382/98.2; 382/146

[58] Field of Search ..................................... 348/209, 217, 348/325, 326, 331, 215, 216; 315/151, 158; 378/98.8, 146, 98.2; 250/214 VT

[56] References Cited

U.S. PATENT DOCUMENTS

| | | | |
|---|---|---|---|
| 4,413,178 | 11/1983 | Mourou et al. | 250/213 VT |
| 4,739,408 | 4/1988 | Gehrmann | 358/217 |
| 4,740,685 | 4/1988 | Koishi | 250/213 VP |
| 4,801,796 | 1/1989 | Kinoshita | 250/213 VT |
| 4,942,293 | 7/1990 | Koishi et al. | 250/213 VT |
| 4,945,224 | 7/1990 | Koishi et al. | 250/213 VT |
| 4,947,031 | 8/1990 | Koishi et al. | 250/213 VT |
| 5,043,568 | 8/1991 | Tsuchiya et al. | 250/213 VT |
| 5,045,761 | 9/1991 | Takahashi | 315/410 |

FOREIGN PATENT DOCUMENTS

| | | | |
|---|---|---|---|
| 3-67447 | 3/1991 | Japan | H01J 31/50 |
| 4-9449 | 2/1992 | Japan | G01J 11/00 |
| 4-38304 | 6/1992 | Japan | G01J 1/42 |
| 2 186 075 | 8/1987 | United Kingdom | G01N 21/64 |

OTHER PUBLICATIONS

"Measurements Of Ultrashort Optical Pulses by Streak Cameras", Yutaka Tsuchiya, The Review of Laser Engineering, vol. 15, No. 11, Nov. 1987, The Laser Society of Japan, pp. 896–904.

XP 002044386 Gaseous Breakdown Studies Using a Modified Image Converter Streak Camera; Hong et al., 8127 Review of Scientified Instruments vol. 52 (1981), Dec. No. 12, New York, USA pp. 1824–1829.

*Primary Examiner*—Wendy Garber
*Assistant Examiner*—Eric Ferguson
*Attorney, Agent, or Firm*—Sughrue, Mion, Zinn, Macpeak & Seas, PLLC

[57] ABSTRACT

A streak tube sweeping method in which a synchronization scan sweeping signal of a fixed repetition frequency is applied to vertical deflection plates in a streak tube, causing an electron beam, generated when a light to be measured is introduced to a photocathode in the streak tube, to sweep at the fixed repetition frequency across a phosphor screen in a first direction. At predetermined intervals that are multiples of the synchronization scan sweeping signal period, a horizontal blanking signal is applied to horizontal deflection plates in the streak tube, causing the electron beam to sweep a streak once every pulse across an output effective area of the phosphor screen. Hence, information of emitted light can be accurately measured even if the life of the light to be measured is longer than the period of the synchronization scan sweeping signal (or the period of the light pulse output from a laser light source, which is the source of the sweeping signal).

24 Claims, 12 Drawing Sheets

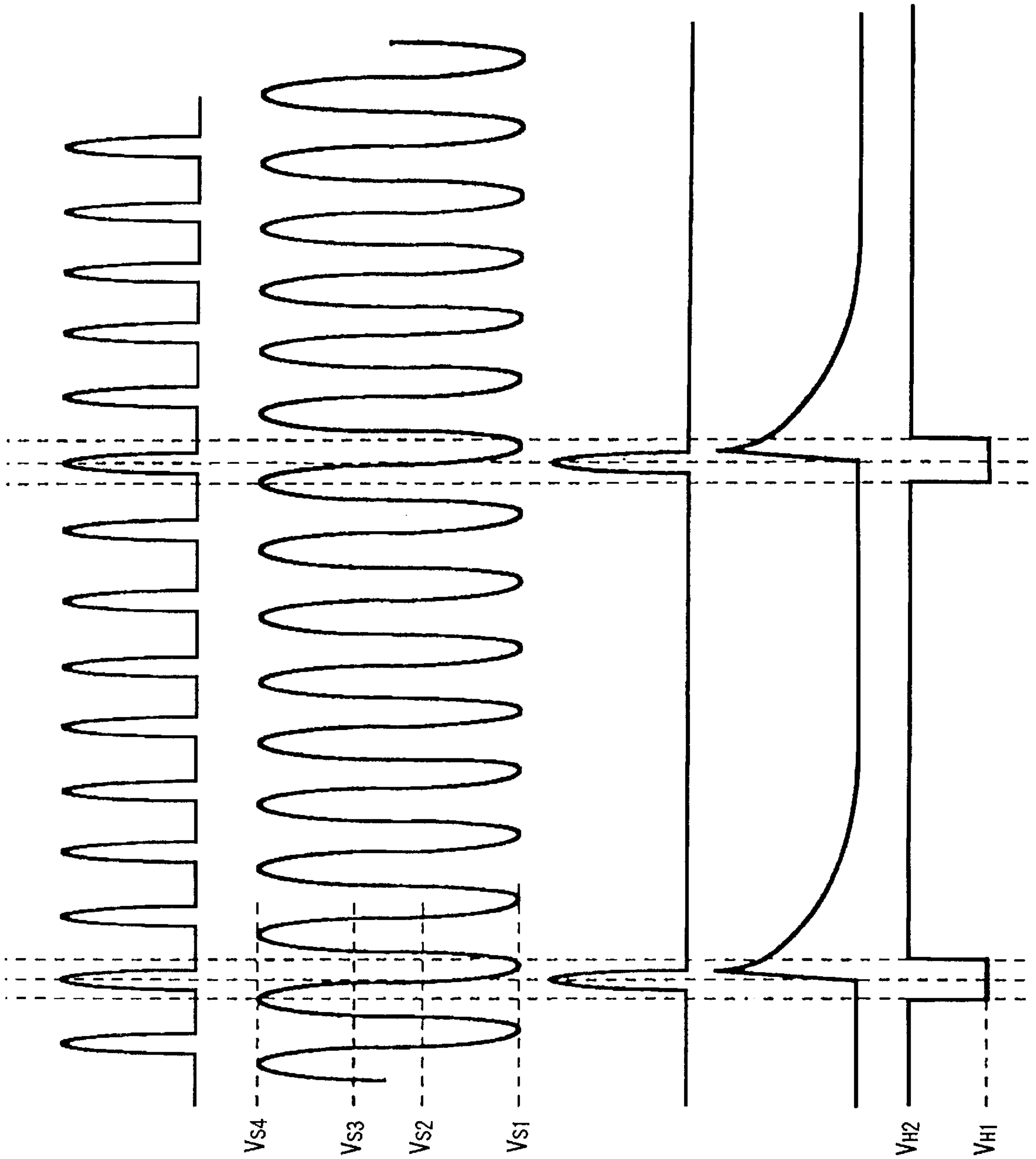
FIG. 4 (a) LASER LIGHT OUTPUT
FIG. 4 (b) SYNC SCAN SWEEPING SIGNAL (STREAK SWEEPING SIGNAL)
FIG. 4 (c) LIGHT TO BE MEASURED (OUTPUT FROM SAMPLE)
FIG. 4 (d) OPTICAL OUTPUT FROM PULSE SELECTOR (INCIDENT LIGHT TO SAMPLE)
FIG. 4 (e) H BLANKING SIGNAL

SYNC SCAN SWEEPING SIGNAL

H BLANKING SIGNAL

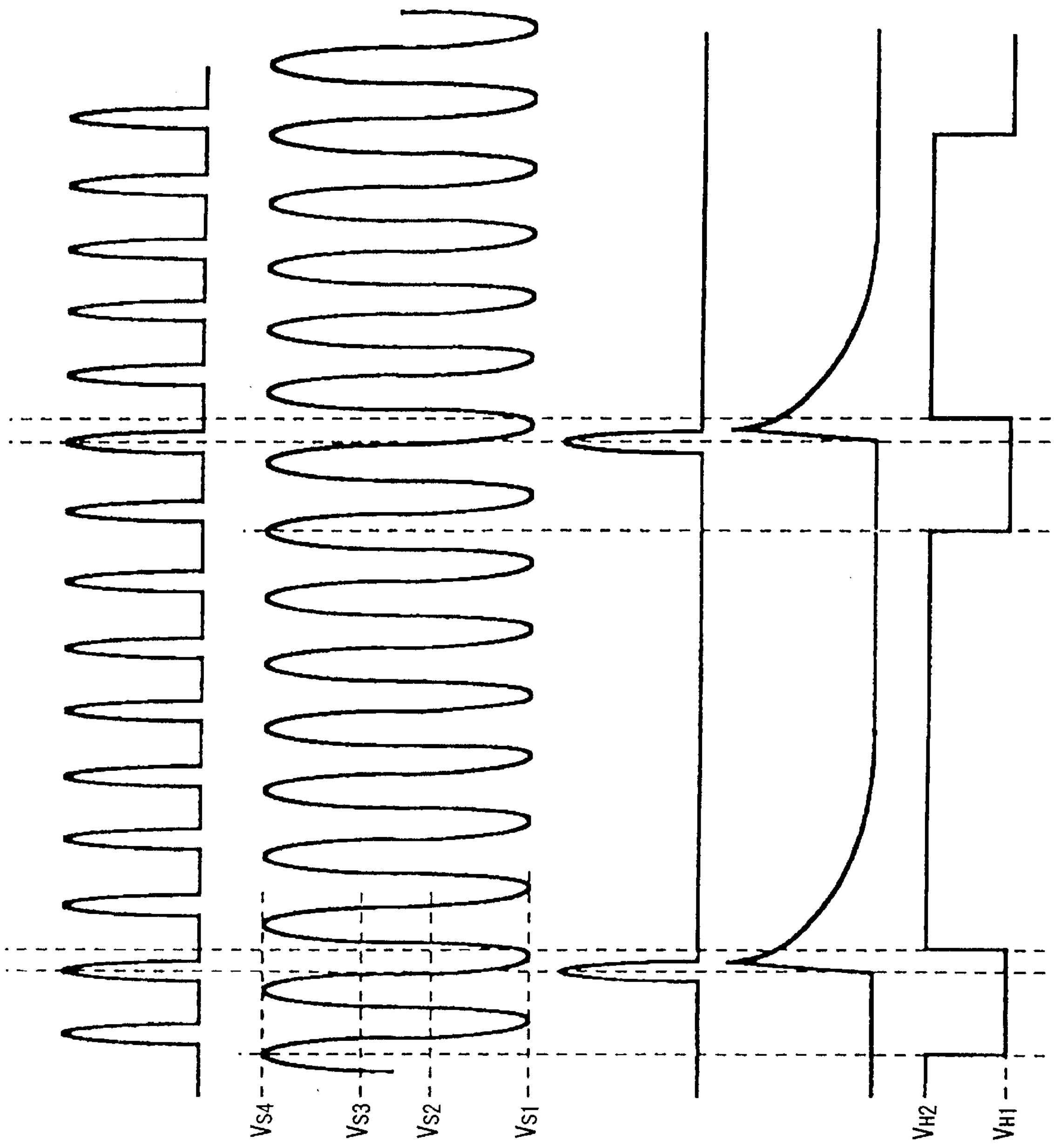
FIG. 6 (a) LASER LIGHT OUTPUT
FIG. 6 (b) SYNC SCAN SWEEPING SIGNAL (STREAK SWEEPING SIGNAL)
FIG. 6 (c) LIGHT TO BE MEASURED (OUTPUT FROM SAMPLE)
FIG. 6 (d) OPTICAL OUTPUT FROM PULSE SELECTOR (INCIDENT LIGHT TO SAMPLE)
FIG. 6 (e) H BLANKING SIGNAL

SYNC SCAN SWEEPING SIGNAL

H BLANKING SIGNAL

STREAK TUBE SWEEPING METHOD AND A DEVICE FOR IMPLEMENTING THE SAME

BACKGROUND OF THE INVENTION

1. Field of the Invention

The present invention relates to a sweeping technology for a streak tube that can detect optical events which occur in very short time intervals.

2. Description of the Prior Art

In streak tubes, light to be measured is introduced onto a photocathode which generates a number of photoelectrons corresponding to the amount of light. The photoelectrons are accelerated and focused in an electron beam. A sweeping signal is applied to deflection plates provided in the path of the electron beam. The electron beam is deflected on the deflection plates, forming a streak image on a phosphor screen. The streak image is used to measure the strength of the introduced light.

When used in combination with a titanium sapphire laser light source for generating a light pulse at a high repeating frequency stabilized at about 100 MHz, the streak tube not only can measure extremely faint fluorescent light and the like, but can accurately accumulate faint streak images at the same position on the phosphor screen by applying to the deflection plate a sweeping signal in the form of a sinusoidal wave, synchronized with the high repeating frequency of the laser light source. Therefore, optical event can be measured in a short time duration with few jitters and a high signal-to-noise ratio.

Methods for applying a sweeping signal to the deflection plates in a streak tube that are well-known in the art include a single sweeping method, synchronization scan sweeping method, duplex sweeping method, and elliptical sweeping method. The diagrams in FIGS. 1(*a*) through 1(*c*) illustrate the single sweeping method known in the art. FIG. 1(*a*) shows the waveform of a synchronization scan sweeping signal; FIG. 1(*b*) shows the waveform of a horizontal (H) blanking signal; and FIG. 1(*c*) shows the movement of the electron beam over the phosphor screen. The synchronization scan sweeping signal and horizontal blanking signal are generated in synchronicity with the light pulse output from the laser light source.

The synchronization scan sweeping signal is applied to vertical deflection plates in the streak tube. Simultaneously, the horizontal blanking signal is applied to the horizontal deflection plates in the streak tube. When these signals are applied, the electron beam issued when light to be measured is introduced onto the photocathode is deflected by the electric fields formed by the vertical and horizontal deflection plates. The electron beam is scanned over the phosphor screen as shown in FIG. 1(*c*). When the horizontal blanking signal is at a low level and the synchronization scan sweeping signal is changing from the low level to the high level, the electron beam is swept to move across the output effective area on the phosphor screen. A streak image is therefore obtained for each period of the synchronization scan sweeping signal, in other words for each optical pulse output from the laser light source. The other conventional sweeping methods also form a streak image of the light to be measured on the phosphor screen for each pulse output from the laser light source.

However, all of the conventional streak tube sweeping methods require the use of a laser light source capable of outputting an optical pulse at a stabilized repeating frequency, because the streak images are all formed precisely at the same position on the phosphor screen. Hence, it is necessary to use a laser light source outputting an optical pulse with a repeating frequency as high as 100 MHz. However, since a streak image of the light to be measured is formed for each optical pulse output from the laser light source, streak images for different times are formed at the same position on the phosphor screen when the time required to generate the light to be measured is longer than the period of the optical pulse.

For example, when exciting fluorescent matter by an optical pulse output from the laser light source and measuring the fluorescent light emitted from the fluorescent matter, if the life of the fluorescent light is longer than the period of the optical pulse output from the laser light source, the fluorescent matter will be excited by the next optical pulse, creating new fluorescent light, before generation of the first fluorescent light has sufficiently completed. In this example, the fluorescent light cannot be accurately measured.

SUMMARY OF THE INVENTION

In view of the foregoing, it is an object of the present invention to provide a streak tube sweeping method and a device for accurately measuring optical event generated longer than the period of the optical pulse output from a laser light source.

To achieve the above and other objects, there is provided a sweeping method for a streak camera system. The streak camera includes a streak camera, a first deflection unit, and a second deflection unit. The streak camera includes an air-tight cylindrical container having a longitudinal axis, a photocathode that receives a light to be measured and generates an electron beam into the air-tight cylindrical container, and an output member disposed in spaced apart relation with the photocathode and having an output effective area for receiving the electron beam. The first deflection unit generates an electrical field in a first direction substantially perpendicular to a direction in which the longitudinal axis extends. The second deflection unit generates an electric field in a second direction substantially perpendicular to both the first direction and the direction in which the longitudinal axis extends. According to the sweeping method of the present invention, a sweeping signal is applied to the first deflection unit to deflect the electron beam back and forth in the first direction, and a blanking signal is applied to the second deflection unit to deflect the electron beam back and forth in the second direction. The sweeping signal has a predetermined frequency and a period determined by the predetermined frequency. The blanking signal has a period equal to a multiple times the period of the sweeping signal and is applied during a period of time at which the light to be measured is incident upon the photocathode. The blanking signal causes the electron beam to scan across the output effective area of the output member only once during one period of the blanking signal.

The blanking signal has a first level and a second level lower different from the first level. When the blanking signal is at the second level, the electron beam scans across the output effective area of the output member. A duration of the second level of the blanking signal is substantially equal to a half of the period of the sweeping signal. When the blanking signal is at the second level, the sweeping signal changes substantially linearly from a first amplitude to a second amplitude.

The period of time at which the light to be measured is incident upon the photocathode may be substantially equal to a half of the period of the sweeping signal. In this case, the duration of the second level of the blanking signal may be longer than the half of the period of the sweeping signal.

In one example, a first trigger signal is generated by photo-electrically converting light pulses having a predetermined repetition frequency, and the sweeping signal is generated in synchronism with the first trigger signal. The light pulses are generated from a light source. From the light pulses generated therefrom, light pulses are extracted at a predetermined interval to generate a second trigger signal which is representative of timings at which extracted light pulses are output. The blanking signal is generated in synchronism with the second trigger signal. The extracted light pulses are irradiated onto a sample, and a light emitted from the sample according to irradiation of the extracted light pulses is introduced onto the photocathode.

In another example, the sweeping signal is generated in synchronism with a first trigger signal which is output in synchronism with light pulses having a predetermined repetition frequency. The light pulses are generated from a light source. From the light pulses generated therefrom, the light pulses are extracted at a predetermined interval to generate a second trigger signal representative of timings at which extracted light pulses are output. The blanking signal is generated in synchronism with the second trigger signal. The extracted light pulses are irradiated onto a sample, and a light emitted from the sample according to irradiation of the extracted light pulses is introduced onto the photocathode.

According to still another example, a first trigger signal having a first frequency is subjected to a frequency multiplication to generate a second trigger signal having a second frequency equal to the predetermined frequency of the sweeping signal. The first trigger signal is output in synchronism with light pulses having a frequency equal to the first frequency. The light pulses are generated from a light source. The sweeping signal is generated in synchronism with the second trigger signal. The blanking signal is generated in synchronism with the first trigger signal. The light pulses generated from the light source is irradiated onto a sample, and a light emitted from the sample according to irradiation of the light pulses is introduced onto the photocathode.

According to still another example of the invention, a first trigger signal having a first frequency is generated based on a second trigger signal having a second frequency lower than the first frequency. The second trigger signal is output in synchronism with light pulses having a predetermined repetition frequency. The light pulses are generated from a light source. The sweeping signal is generated in synchronism with the first trigger signal. The blanking signal is generated in synchronism with the first trigger signal. The light pulses generated from the light source are irradiated onto a sample, and a light emitted from the sample according to irradiation of the light pulses is introduced onto the photocathode.

The present invention also provides a streak camera system which implements the sweeping method described above.

BRIEF DESCRIPTION OF THE DRAWINGS

The above and other objects, features and advantages of the present invention will become more apparent from the following description when taken in conjunction with the accompanying drawings in which:

FIG. 1(*c*) is an explanatory diagram for illustrating an electron beam irradiating position on a phosphor screen of the streak tube according to the conventional streak camera.

FIGS. 4(*a*) through 4(*e*) are waveform diagrams showing various signals used for the streak tube sweeping method according to the first embodiment of the present invention;

FIG. 5(*c*) is an explanatory diagram for illustrating an electron beam irradiating position on a phosphor screen 1of the streak tube according to the first embodiment of the present invention;

FIGS. 6(*a*) through 6(*e*) are waveform diagrams showing various signals used for the streak tube sweeping method according to a second embodiment of the present invention;

FIG. 7(*c*) is an explanatory diagram for illustrating an electron beam irradiating position on a phosphor screen of the streak tube according to the second embodiment of the present invention;

DETAILED DESCRIPTION OF THE PREFERRED EMBODIMENTS

Figure 1:
FIG. 1 (a) PRIOR ART
FIGS. 1(*a*) and 1(*b*) are waveform diagrams showing a synchronization scan sweeping signal and a horizontal blanking signal used in a conventional streak tube.
Figure 1:
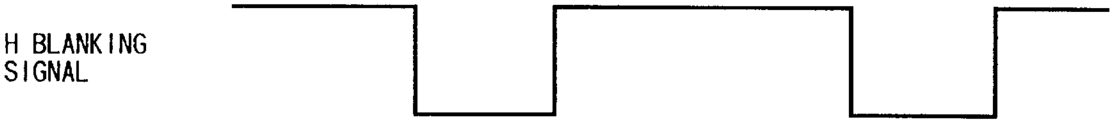
FIG. 1 (b) PRIOR ART
Figure 1:
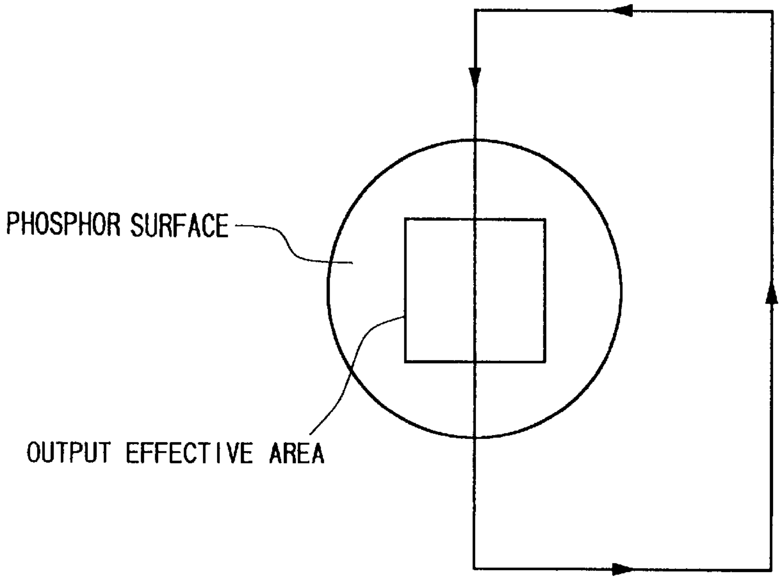
FIG. 1 (c) PRIOR ART
Figure 2:
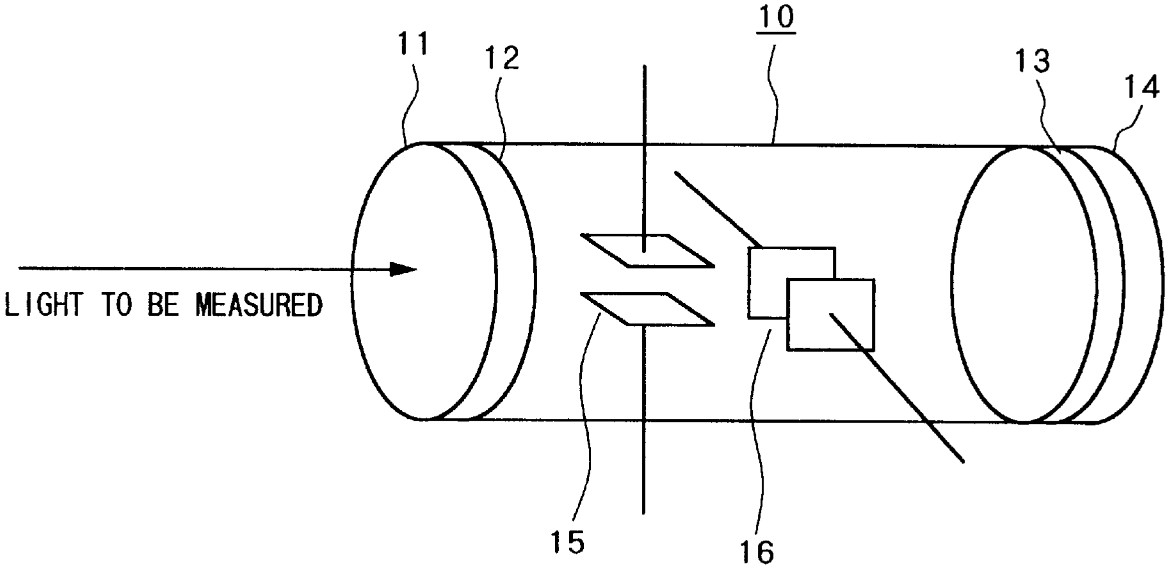
FIG. 2 is a schematic diagram showing a streak tube.

A streak tube sweeping method according to preferred embodiments of the present invention will be described while referring to the accompanying drawings.

First, a streak tube 10 used in the present invention will be described. The streak tube 10 is an air-tight cylindrical container within which a vacuum is maintained. The streak tube 10 includes a photocathode 11, an accelerator electrode 12, a microchannel plate 13, a phosphor screen 14, vertical deflection plates 15, and horizontal deflection plates 16.

The photocathode 11 is provided at one end of the streak tube 10. When light to be measured is introduced into the photocathode 11, the photocathode 11 generates a number of photoelectrons corresponding to the strength of the light. The photoelectrons are accelerated according to the acceleration voltage applied to the accelerator electrode 12. An electron beam of the photoelectrons passes through the air-tight container and reaches the microchannel plate 13 on the opposing end of the streak tube 10. The electron beam is amplified by the microchannel plate 13 and introduced onto the phosphor screen (output surface) 14, generating fluorescent light on that surface. The strength of the generated fluorescent light corresponds to the number of photoelectrons and energy in each of the photoelectrons, that is, in the strength of the light introduced onto the photocathode.

The vertical deflection plates 15 and horizontal deflection plates 16 are arranged as first and second pairs of deflection plates, respectively, between the accelerator electrode 12 and microchannel plate 13. Each pair of deflection plates are parallel electrode plates placed one plate on each side of the electron beam path. Electric fields are generated in both the vertical and horizontal directions by sweeping signals applied between the pairs of parallel electrode plates, which fields deflect the electron beam. Hence, by applying the sweeping signal to each of the vertical deflection plates 15 and horizontal deflection plates 16, time base variations in the strength of the introduced light can be measured as spatial variations on the phosphor screen 14. The present invention relates to the above-described streak tube sweeping method and a sweeping device for implementing the method.

Figure 3:
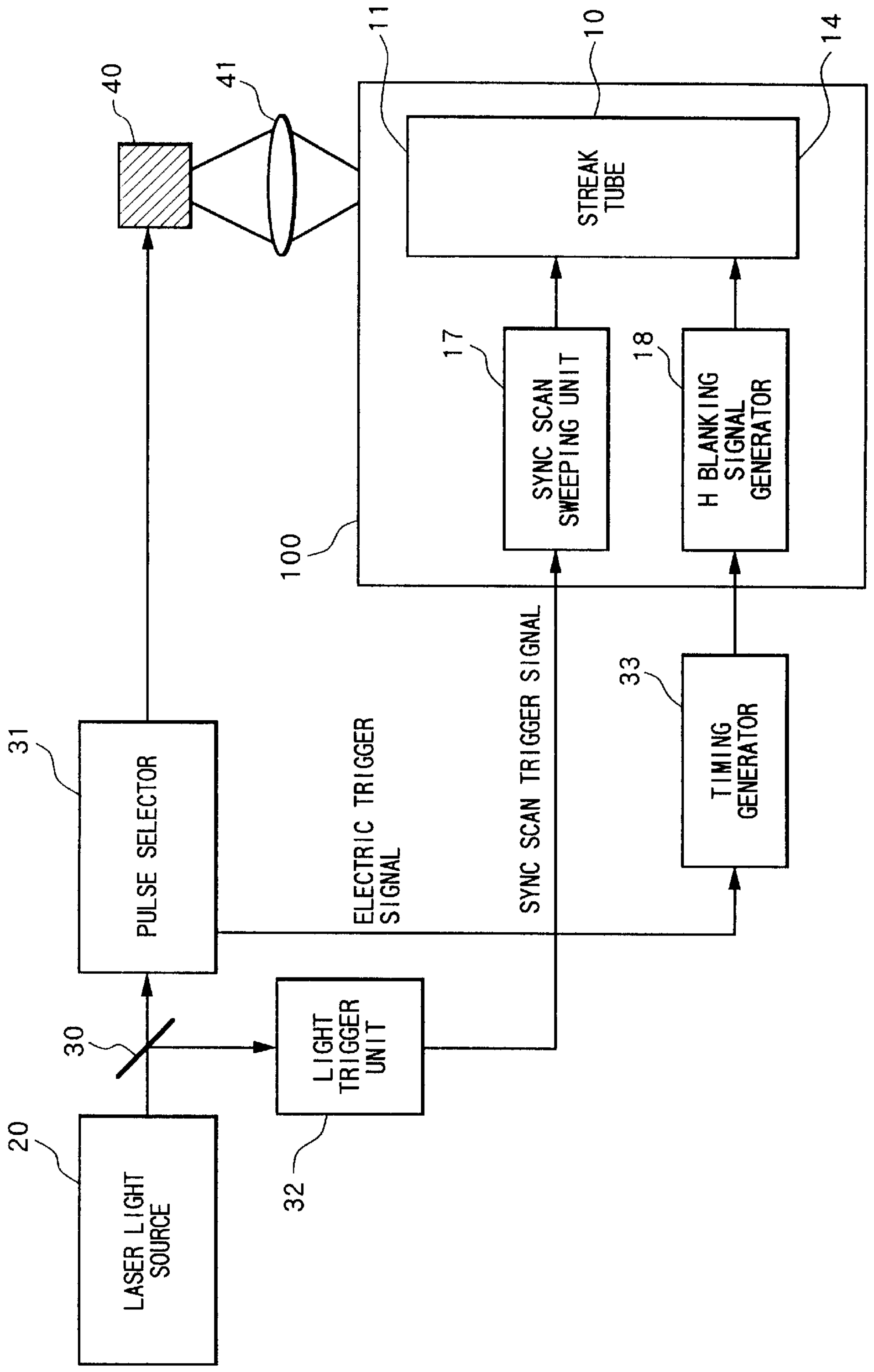
FIG. 3 is a block diagram showing an arrangement of a streak camera system including a streak tube sweeping device according to a first embodiment of the present invention.

Next, a streak tube sweeping device according to a first embodiment of the present invention will be described. FIG. 3 shows the structure of a streak camera system that includes a streak tube sweeping device of the present embodiment.

This streak camera system includes a streak camera 100, a laser light source 20, and a streak tube sweeping device. Generally, a streak camera is defined to include not only the streak tube 10 but also a synchronization scan sweeping unit 17 and a horizontal (H) blanking signal generator 18 for outputting sweeping signals to be applied to the vertical deflection plates 15 and horizontal deflection plates 16, respectively. In this example, however, the synchronization scan sweeping unit 17 and horizontal blanking signal generator 18 will be considered as part of the sweeping device. Also provided as sweeping device are a pulse selector 31, a light trigger unit 32, and a timing generator 33. This diagram shows how a streak camera system is used to measure fluorescent light generated from a sample 40.

The laser light source 20 outputs a stabilized light pulse at a high repetition frequency. For example, a titanium sapphire laser light source having a repetition frequency of 80 MHz may be used. The laser light output from the laser light source 20 is divided into two by a half mirror 30, causing light to be input into both the pulse selector 31 and the light trigger unit 32.

The light trigger unit 32, preferably a high-speed photoelectric converting element such as an avalanche photodiode, converts the light received into an electric pulse signal (synchronization scan trigger signal) proportionate to the amount of light received and outputs that signal to the synchronization scan sweeping unit 17. Based on this synchronization scan trigger signal, the synchronization scan sweeping unit 17 applies an appropriate synchronization scan sweeping signal to the vertical deflection plates 15 in the streak tube 10. The repetition frequency of this synchronization scan sweeping signal is equivalent to that of the light pulse output from the laser light source 20.

The pulse selector 31, which may be provided with a polariscope, receives the other half of the light pulse split by the half mirror 30 and, based on the received light pulse outputs a light pulse at a low repetition frequency according to internal or externally input control signals. The light pulses output from the pulse selector 31 can be either light pulses thinned out with a uniform ratio for the input light pulses or single-shot light pulses. In addition, the pulse selector 31 outputs an electric trigger signal synchronized with the light pulse output.

The light pulse output from the pulse selector 31 is introduced onto the sample 40, exciting fluorescent matter contained in the sample 40. The fluorescent light to be measured that is generated by the excited fluorescent matter is focused by an optical system 41 and introduced onto the photocathode 11 of the streak tube 10.

The electric trigger signal is output from the pulse selector 31 to the timing generator 33, which outputs an electric pulse signal of a predetermined duration of time, synchronous to the timing at which light to be measured is introduced onto the photocathode 11. The horizontal blanking signal generator 18 outputs a horizontal blanking signal based on this electric pulse signal output from the timing generator 33, which horizontal blanking signal is applied to the horizontal deflection plates 16 in the streak tube 10.

An example of the timing for each light pulse and electric signal mentioned above will be described. FIGS. 4(*a*) through 4(*e*) show various signals generated and used in practicing the streak tube sweeping method of the present embodiment.

FIG. 4(*a*) shows the changes in strength of the laser light output from the laser light source 20. FIG. 4(*b*) shows the synchronization scan sweeping signal output from the synchronization scan sweeping unit 17. This synchronization scan sweeping signal, which is synchronous to the changes in strength of the laser light output from the laser light source 20, is applied to the vertical deflection plates 15 in the streak tube 10, creating an electric field in the vertical deflection plates 15. The generated electric field causes an electron beam moving from the photocathode 11 toward the phosphor screen 14 to be vertically deflected.

As shown in FIG. 4(*b*), the synchronization scan sweeping signal changes at a stabilized repetition frequency between the lowest level $V_{S1}$ and the highest level $V_{S4}$. When the synchronization scan sweeping signal is within a fixed range $V_{S2}$–$V_{S3}$ (where $V_{S1}<V_{S2}<V_{S3}<V_{S4}$), and the horizontal blanking signal is within a fixed range, the electron beam generated by the photocathode 11 scans the output effective area of the phosphor screen 14. The synchronization scan sweeping signal can have either a sawtooth waveform or a sinusoidal waveform, but it is desirable that the portion of signal between $V_{S2}$ and $V_{S3}$ be a straight line. For example, if the synchronization scan sweeping signal has a sinusoidal waveform and $V_{S4}-V_{S1}=3$ kV and $V_{S3}-V_{S2}=200$ V, then the portion of signal between $V_{S2}$ and $V_{S3}$ can be considered a straight line.

FIG. 4(*c*) shows the light pulse output from the pulse selector 31 and applied to the sample 40. This light pulse is the result of thinning down to a fixed ratio the laser light input from the laser light source 20. FIG. 4(*d*) shows the changes in strength of the fluorescent light to be measured, which light is generated by the sample 40 and introduced to the photocathode 11 when the light pulse of FIG. 4(*c*) is applied to the sample 40. This light to be measured is generated during each period that a light pulse is applied to the sample 40 and decays at a curve corresponding to the life of fluorescent light. Here, the period of the light pulse output from the pulse selector 31 must be set to at least five times the life of fluorescent light to be sufficiently longer than the time required for the fluorescent light to decay.

FIG. 4(*e*) shows the horizontal blanking signal output from the horizontal blanking signal generator 18. This signal, which is synchronous with the light pulse output from the pulse selector 31, is applied to the horizontal deflection plates 16 in the streak tube 10, creating an electric field in the horizontal deflection plates 16. The generated electric field causes an electron beam moving from the photocathode 11 toward the phosphor screen 14 to be horizontally deflected. The horizontal blanking signal has a rectangular waveform with a lower level $V_{H1}$ and an upper level $V_{H2}$. When the horizontal blanking signal is at the lower level $V_{H1}$ and the synchronization scan sweeping signal is within a fixed range, the electron beam generated by the photocathode 11 scans the output effective area of the phosphor screen 14.

The level of the synchronization scan sweeping signal must change only once from being greater than $V_{S3}$ to being less than $V_{S2}$ (or from being less than $V_{S2}$ to being greater than $V_{S3}$) during the time period that the horizontal blanking signal is at the lower level $V_{H1}$ and while the light to be measured is being introduced onto the photocathode 11. The horizontal blanking signal generator 18 outputs a horizontal blanking signal capable of satisfying the above-described conditions.

As shown in FIGS. 4(*a*) through 4(*e*), the synchronization scan sweeping signal reaches the maximum level $V_{S4}$ just before the light to be measured is applied to the photocathode 11 and reaches the minimum level $V_{S1}$ just after the light to be measured is applied to the photocathode 11. Hence, the synchronization scan sweeping signal changes from $V_{S4}$ to $V_{S1}$ during this time period. Also during this time period, the horizontal blanking signal is at the lower level $V_{H1}$.

Figures 5A, 5B:
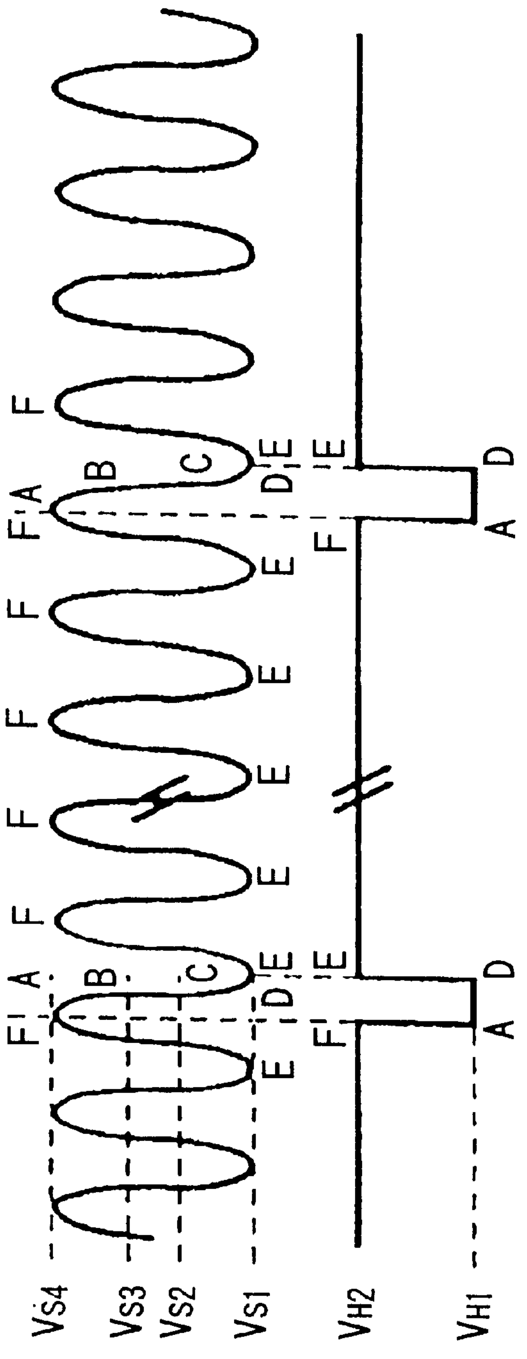
FIGS. 5(*a*) and 5(*b*) are waveform diagrams showing a synchronization scan sweeping signal and a horizontal blanking signal used in the first embodiment of the present invention.
Figure 5:
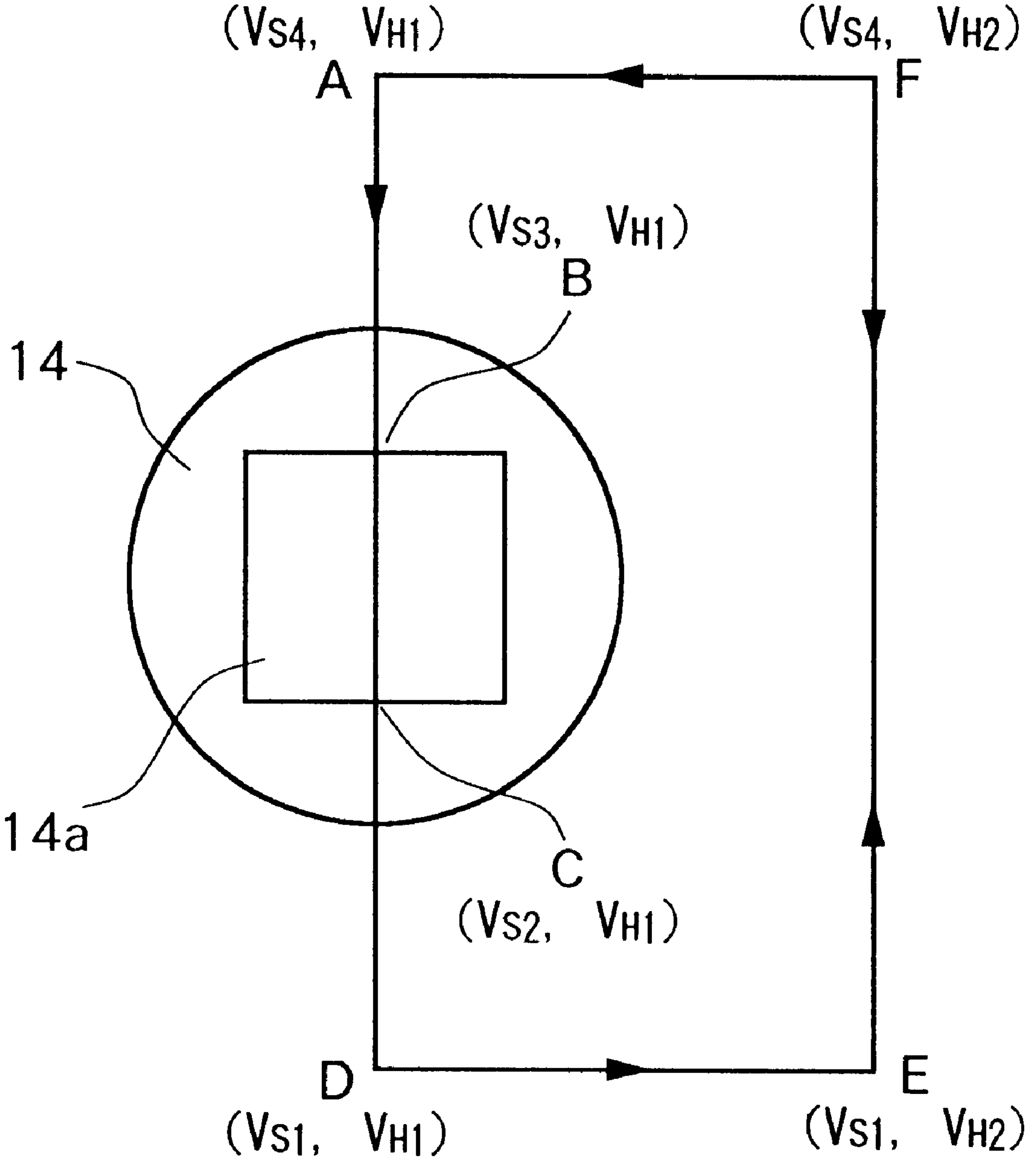

When the synchronization scan sweeping signal and horizontal blanking signal shown in FIGS. 4(*b*) and 4(*e*) are applied to the vertical deflection plates 15 and horizontal deflection plates 16, respectively, the irradiation position of the electron beam on the phosphor screen 14 moves as shown in FIG. 5(*c*). FIG. 5(*a*) shows the waveform of the synchronization scan sweeping signal identical to that shown in FIG. 4(*b*). FIG. 5(*b*) shows the waveform of the horizontal blanking signal identical to that shown in FIG. 4(*e*). As shown in FIG. 5(*c*), an output effective area 14*a* on the phosphor screen 14 is the area in which a streak image can effectively be output.

From point A ($V_{S4}$, $V_{H1}$) to point B ($V_{S3}$, $V_{H1}$), the electron beam scans above, but not inside of, the output effective area 14*a*. At point B ($V_{S3}$, $V_{H1}$), the electron beam has scanned the edge of the output effective area 14*a*. From point B ($V_{S3}$, $V_{H1}$) to point C ($V_{S2}$, $V_{H1}$), the electron beam scans within the output effective area 14*a*. From point C ($V_{S2}$, $V_{H1}$) to point D ($V_{S1}$, $V_{H1}$), the electron beam scans below, but not inside of, the output effective area 14*a*.

When the horizontal blanking signal changes to the upper level $V_{H2}$, and both signals change from point D ($V_{S1}$, $V_{H1}$) to point E ($V_{S1}$, $V_{H2}$), the scanning position of the electron beam moves to the right. Obviously, the electron beam is not scanning inside the output effective area 14*a* at this time. The two signals move back and forth between point E ($V_{S1}$, $V_{H2}$) and point F ($V_{S4}$, $V_{H2}$), and the horizontal blanking signal remains at the upper level $V_{H2}$. During this time, the synchronization scan sweeping signal changes between the lowest level $V_{S1}$ and the highest level $V_{S4}$, and the electron beam simply moves up and down along the right side of the output effective area 14*a*, not scanning therein. When the two signals change from point F ($V_{S4}$, $V_{H2}$) back to point A ($V_{S1}$, $V_{H1}$), the horizontal blanking signal changes again to the lower level $V_{H1}$, and the electron beam scans above the output effective area 14*a*.

As described above, the synchronization scan sweeping signal and the horizontal blanking signal change levels in the form A→B→C→D→E→F→E→. . . →F→E→F→A. Only during the time the signals move from point B to point C, the electron beam created when the light to be measured is introduced onto the photocathode 11 sweeps a streak one time on the output effective area 11*a*. The streak image obtained on the output effective area 11*a* is linear in time if the synchronization scan sweeping signal passing from the level $V_{S3}$ to the level $V_{S2}$ is also linear in relation to time.

Each time a light pulse output from the pulse selector 31 is applied to the sample 40 while the synchronization scan sweeping signal and horizontal blanking signal change as described above, the previous fluorescent light to be measured has sufficiently decayed. Accordingly, only information for a single streak image is obtained on the output effective area 14*a* of the phosphor screen 14, and the image is not overlapped with information for a previous streak image. Further, the obtained streak image is the one in the initial period of the fluorescent light information, and the strength of that fluorescent light changes greatly as time elapses. Therefore, the life of the fluorescent light issued from the sample 40 can be measured satisfactorily.

It is necessary to accumulate many streak images when the light to be measured is weak. However, since both the synchronization scan sweeping signal and horizontal blanking signal are generated based on the stabilized high repetition frequency light pulse output from the laser light source 20, many streak images of the light can be accurately accumulated at the same position.

Further, the horizontal blanking signal is not restricted to the one shown in FIGS. 4(*e*) and 5(*b*), but can also be a signal as shown in FIGS. 6(*e*) and 7(*b*). FIGS. 6(*a*) through 6(*e*) show various signals for practicing the streak tube sweeping method of a second embodiment to be described later.

The strength variations of the laser light shown in FIG. 6(*a*), the synchronization scan sweeping signal in FIG. 6(*b*), the light pulse output from the pulse selector shown in FIG. 6(*c*), and the strength variations of the light to be measured shown in FIG. 6(*d*) are exactly the same as the respective diagrams FIGS. 4(*a*) through 4(*d*) described above in the first embodiment. However, the horizontal blanking signal shown in FIG. 6(*e*), which is output from the horizontal blanking signal generator 18, differs from the horizontal blanking signal of FIG. 4(*e*) described above.

The signal in FIG. 6(*e*), which is synchronous with the light pulse output from the pulse selector 31, is also applied to the horizontal deflection plates 16 in the streak tube 10, creating an electric field in the horizontal deflection plates 16. The generated electric field causes an electron beam moving from the photocathode 11 toward the phosphor screen 14 to be horizontally deflected. The horizontal blanking signal has a rectangular waveform with a lower level $V_{H1}$ and an upper level $V_{H2}$. When the horizontal blanking signal is at the lower level $V_{H1}$ and the synchronization scan sweeping signal is within a fixed range, the electron beam generated by the photocathode 11 scans on the output effective area of the phosphor screen 14.

As shown in FIGS. 6(*a*) through 6(*e*), from the point that the synchronization scan sweeping signal reaches the maximum level $V_{S4}$, at least one period before the light to be measured is applied to the photocathode 11, until the point that the same signal reaches the minimum level $V_{S1}$, just after the light to be measured is applied to the photocathode 11, the horizontal blanking signal is at the lower level $V_{H1}$ and the synchronization scan sweeping signal oscillates between the levels $V_{S4}$ and $V_{S1}$ for at least one period. Hence, the level of the synchronization scan m sweeping signal changes only once from a level greater than $V_{S3}$ to a level less than $V_{S2}$ while the horizontal blanking signal is at the lower level $V_{H1}$ and while the light to be measured is introduced onto the photocathode 11. Also during this time period, only one streak image is obtained.

Figures 7A, 7B:
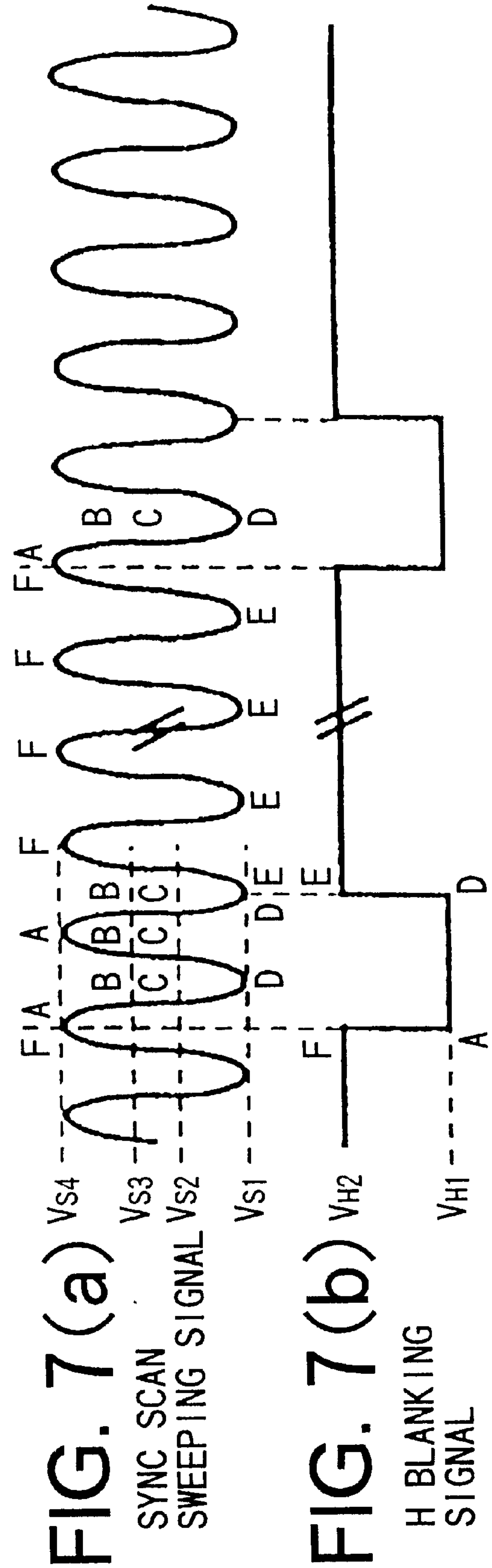
FIGS. 7(*a*) and 7(*b*) are waveform diagrams showing a synchronization scan sweeping signal and a horizontal blanking signal used in the second embodiment of the present invention.
Figure 7:
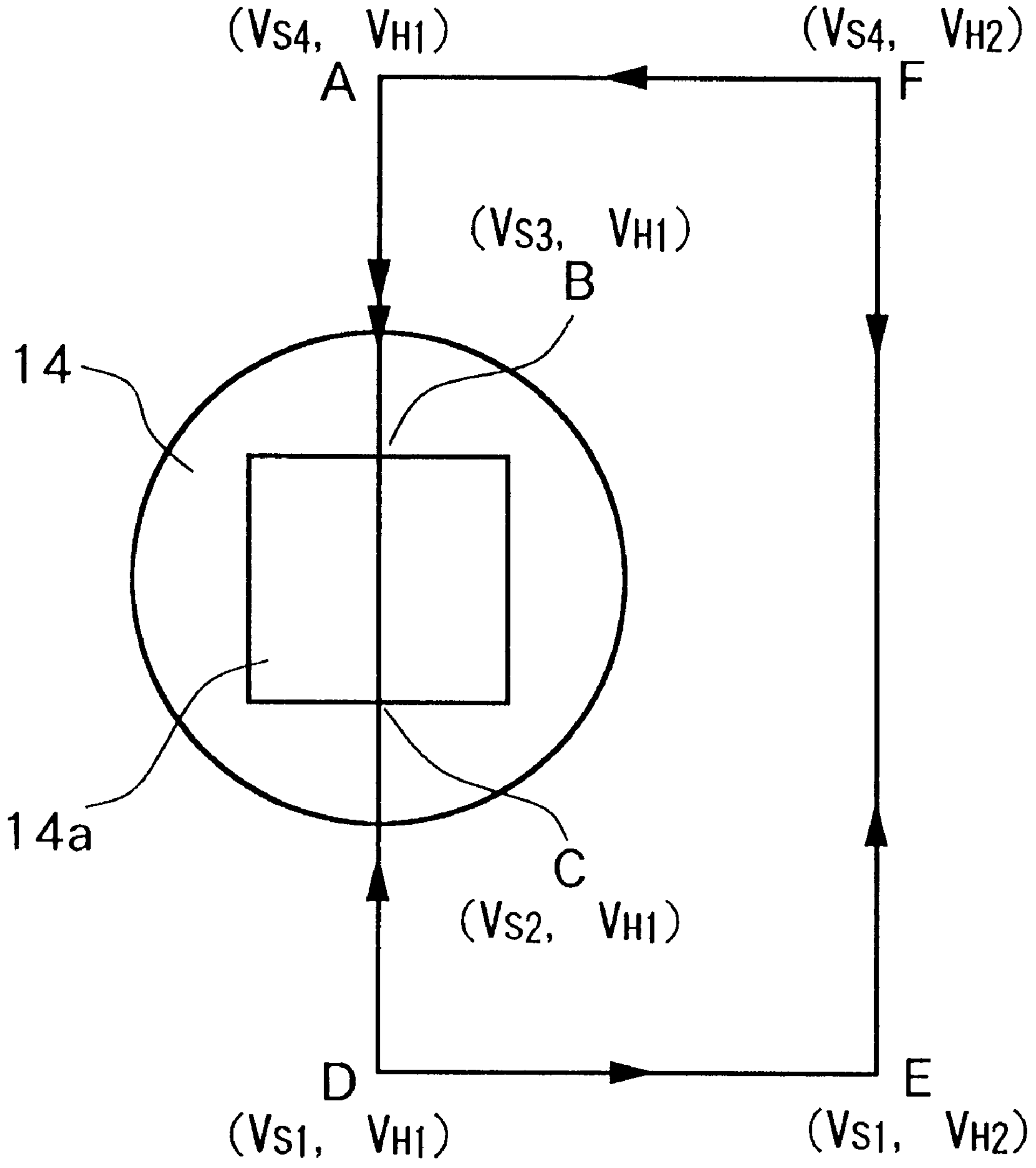

When the synchronization scan sweeping signal and horizontal blanking signal shown in FIGS. 6(*b*) and 6(*e*) are applied to the vertical deflection plates 15 and horizontal deflection plates 16, respectively, the irradiation position of the electron beam on the phosphor screen 14 moves as shown in FIG. 7(*c*). FIG. 7(*a*) shows the waveform of the synchronization scan sweeping signal identical to that shown in FIG. 6(*b*). FIG. 7(*b*) shows the waveform of the horizontal blanking signal identical to that shown in FIG. 6(*e*). FIG. 7(*c*) shows the movement of the electron beam across the output effective area 14*a* on the phosphor screen 14.

From point A ($V_{S4}$, $V_{H1}$) to point B ($V_{S3}$, $V_{H1}$), the electron beam issued from the photocathode 11 when light is applied thereon scans above, but not inside of, the output effective area 14*a*. At point B ($V_{S3}$, $V_{H1}$), the electron beam has scanned the edge of the output effective area 14*a*. From point B ($V_{S3}$, $V_{H1}$) to point C ($V_{S2}$, $V_{H1}$), the electron beam scans within the output effective area 14*a*. From point C ($V_{S2}$, $V_{H1}$) to point D ($V_{S1}$, $V_{H1}$), the electron beam scans below, but not inside of, the output effective area 14*a*.

Here, the scanning position of the electron beam returns from point D via points C and B to point A, and again moves from point A to point B to point C and to point D. In other words, the scanning position of the electron beam moves forward from A to D, back to A, and forward again to D. However, during the first two passes, from A to D and back to A, the light to be measured is not introduced onto the photocathode 11 of the streak tube 10, and therefore a streak image is not obtained on the output effective area 14*a*. Only when the migrating position of the electron beam moves a second time from point B to point C is the light introduced onto the photocathode 11, allowing a streak image to be obtained on the output effective area 14*a*.

When the horizontal blanking signal changes to the upper level $V_{H2}$, and both signals change from point D ($V_{S1}$, $V_{H1}$) to point E ($V_{S1}$, $V_{H2}$), the scanning position of the electron beam moves to the right. Obviously, the electron beam is not scanning inside the output effective area 14*a* at this time. The two signals move back and forth between point E ($V_{S1}$, $V_{H2}$) and point F ($V_{S4}$, $V_{H2}$), and the horizontal blanking signal remains at the upper level $V_{H2}$. During this time, the synchronization scan sweeping signal changes between the lowest level $V_{S1}$ and the highest level $V_{S4}$, and the electron beam simply moves up and down along the right side of the output effective area 14*a*, not scanning therein. When the two signals change from point F ($V_{S4}$, $V_{H2}$) back to point A ($V_{S1}$, $V_{H1}$), the horizontal blanking signal changes again to the lower level $V_{H1}$, and the electron beam scans above the output effective area 14*a*.

As described above, during each period of the horizontal blanking signal, when the signals move from point B to point C a second time, the electron beam sweeps a streak one time across the output effective area 11*a*. The streak image obtained on the output effective area 11*a* is linear in time if the synchronization scan sweeping signal passing from the level $V_{S3}$ to the level $V_{S2}$ is also linear in relation to time.

With this horizontal blanking signal as well, each time a light pulse output from the pulse selector 31 is applied to the sample 40 while the synchronization scan sweeping signal and horizontal blanking signal change as described above, the previous fluorescent light to be measured has sufficiently decayed. Accordingly, only information for a single streak image is obtained on the output effective area 14*a* of the phosphor screen 14, and the image is not overlapped with information for a previous streak image. Further, the streak image obtained is the one in the initial period of the fluorescent light information, and the strength of that fluorescent light changes greatly as time elapses. Therefore, the life of the fluorescent light issued from the sample 40 can be measured satisfactorily. Even when accumulating many streak images, since both the synchronization scan sweeping signal and horizontal blanking signal are generated based on the stabilized high repetition frequency light pulse output from the laser light source 20, many streak images of the light can be accurately accumulated at the same position.

The sweeping device for generating a synchronization scan sweeping signal and a horizontal blanking signal described above is not limited to the configuration shown in FIG. 3. Other possible configurations for streak tube sweeping device will be described below.

Figure 8:
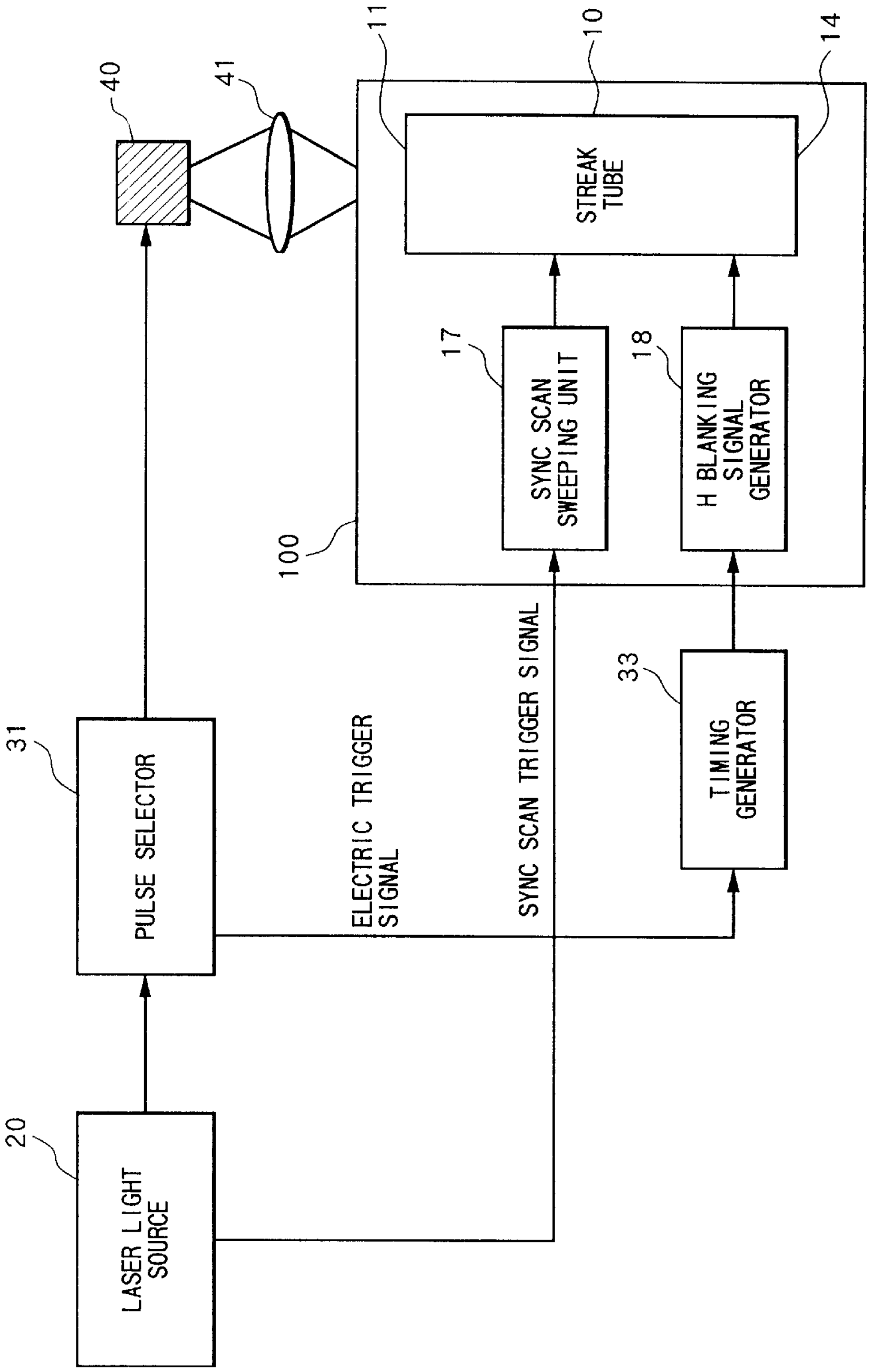
FIG. 8 is a block diagram showing an arrangement of a streak camera system including a streak tube sweeping device according to the second embodiment of the present invention.

Next, a streak tube sweeping device according to a second embodiment of the present invention will be described. FIG. 8 shows the structure of a streak camera system that includes the streak tube sweeping device of the second embodiment. In comparison with the system of FIG. 3 described in the first embodiment, this streak camera system differs at two points. First, the laser light source 20 outputs an electric trigger signal (synchronization scan trigger signal) representing the output timing of light pulses. Second, the synchronization scan sweeping unit 17 generates a synchronization scan sweeping signal based on the synchronization scan trigger signal output from the laser light source 20.

Based on an electric trigger signal output from an internal oscillating circuit contained in the laser light source 20, the latter outputs both a stabilized light pulse at a high repetition frequency as shown in FIG. 4(*a*) and the electric trigger signal as a synchronization scan trigger signal which signal is applied to the synchronization scan sweeping unit 17. The latter unit 17 generates a synchronization scan sweeping signal based on the synchronization scan trigger signal. The synchronization scan sweeping signal is applied to the vertical deflection plates 15 of the streak tube 10.

The pulse selector 31 receives the high repetition frequency light pulse output from the laser light source 20 and, based on those light pulses, outputs a light pulse at a low repetition frequency as shown in FIG. 4(*c*) according to internal or externally input control signal. In addition, the pulse selector 31 outputs an electric trigger signal synchronized with the light pulse output.

The light pulse output from the pulse selector 31 is introduced onto the sample 40, exciting fluorescent matter contained in the sample 40. The fluorescent light to be measured (as shown in FIG. 4(*d*)) that is generated by the excited fluorescent matter is focused by the optical system 41 and introduced onto the photocathode 11 of the streak 43 tube 10.

The electric trigger signal is output from the pulse selector 31 to the timing generator 33, which outputs an electric pulse signal of a predetermined duration of time, synchronous to the timing at which light to be measured is introduced onto the photocathode 11. The horizontal blanking signal generator 18 outputs a horizontal blanking signal based on this electric pulse signal output from the timing generator 33, which horizontal blanking signal is applied to the horizontal deflection plates 16 in the streak tube 10. The synchronization scan sweeping signal and horizontal blanking signal are exactly the same as described in the first embodiment.

Figure 9:
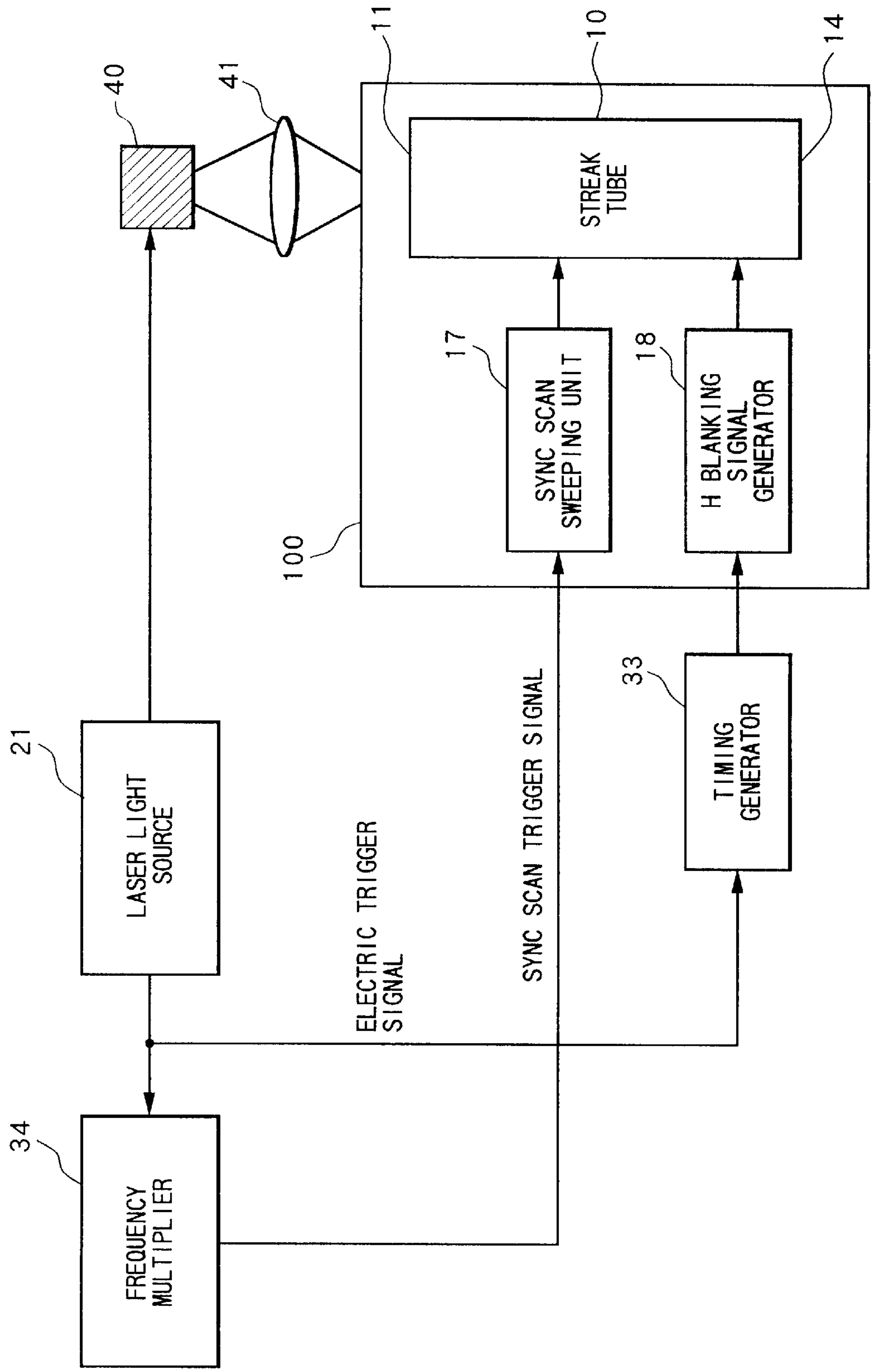
FIG. 9 is a block diagram showing an arrangement of a streak camera system including a streak tube sweeping device according to a third embodiment of the present invention.

Next, a streak tube sweeping device according to a third embodiment of the present invention will be described. FIG. 9 shows the structure of a streak camera system that includes the streak tube sweeping device of the third embodiment.

In this streak camera system, a laser light source 21 outputs a stabilized light pulse at a low repetition frequency based on an electric trigger signal output from an internal oscillating circuit contained in the laser light source 21. The laser light source 21 outputs the electrical trigger signal as well.

The light pulse output from the laser light source 21 is introduced onto the sample 40, exciting fluorescent matter contained in the sample 40. The fluorescent light to be measured that is generated by the excited fluorescent matter is focused by the optical system 41 and introduced onto the photocathode 11 of the streak tube 10.

A frequency multiplier 34 receives the electric trigger signal output from the laser light source 21, multiplies the frequency of the signal, and outputs a synchronization scan trigger signal with the multiplied frequency. The synchronization scan sweeping unit 17 generates a synchronization scan sweeping signal based on the synchronization scan trigger signal. The synchronization scan sweeping signal is applied to the vertical deflection plates 15 of the streak tube 10.

The electric trigger signal is output from the laser light source 21 to the timing generator 33, which outputs an electric pulse signal of a predetermined duration of time, synchronous to the timing at which light to be measured is introduced onto the photocathode 11. The horizontal blanking signal generator 18 outputs a horizontal blanking signal based on this electric pulse signal output from the timing generator 33, which horizontal blanking signal is applied to the horizontal deflection plates 16 in the streak tube 10. The synchronization scan sweeping signal and horizontal blanking signal are exactly the same as described in the first embodiment.

Figure 10:
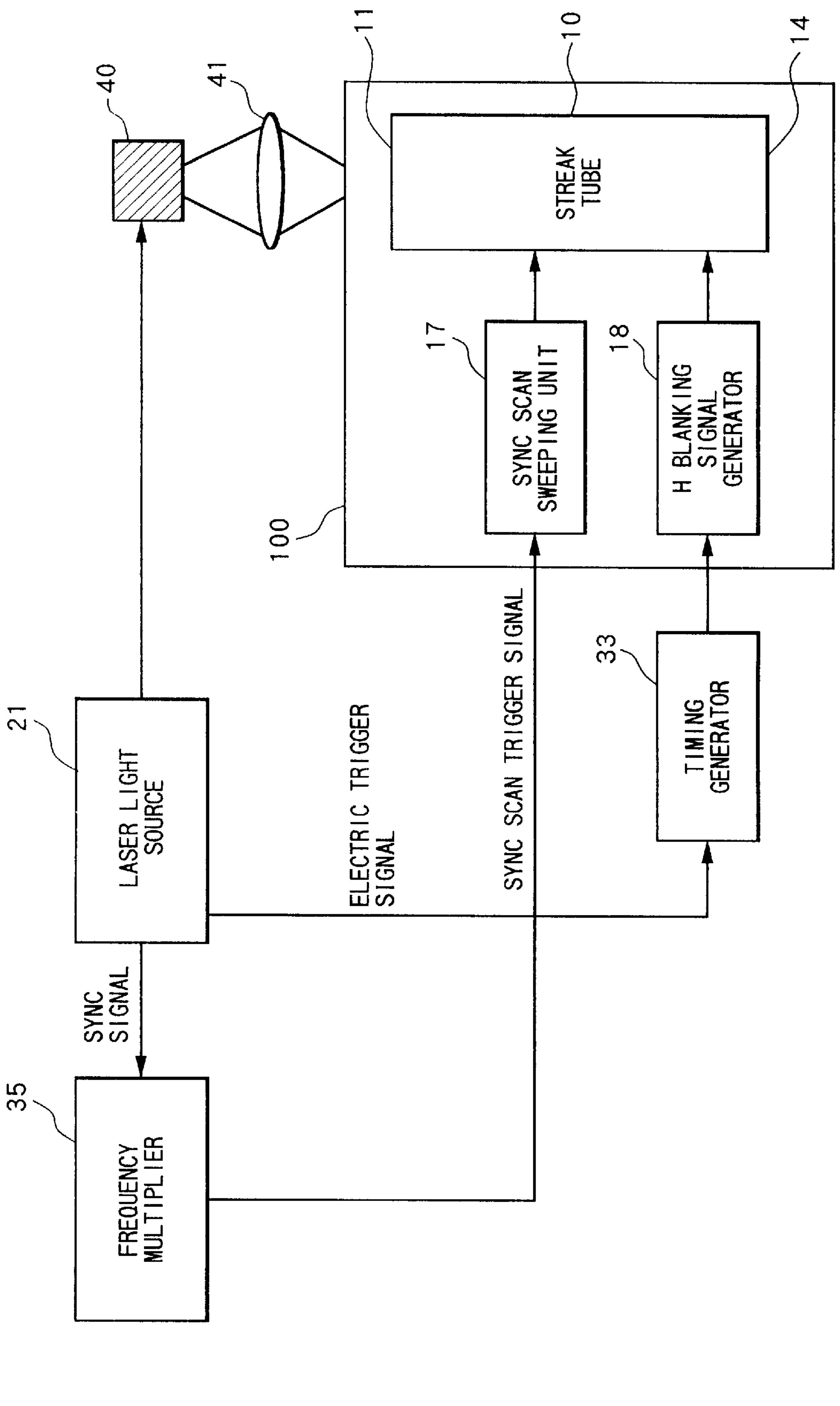
FIG. 10 a block diagram showing an arrangement of a streak camera system including a streak tube sweeping device according to a fourth embodiment of the present invention.

Next, a streak tube sweeping device according to a fourth embodiment of the present invention will be described. FIG. 10 shows the structure of a streak camera system that includes the streak tube sweeping device of the fourth embodiment. In comparison with the system of FIG. 9 described in the third embodiment, this streak camera system differs in that a frequency synthesizer 35 is provided in place of the frequency multiplier 34.

Based on electric trigger signals output from an internal oscillating circuit contained in the laser light source 21, the laser light source 21 outputs a stabilized light pulse at a low repetition frequency, as well as an electric trigger signal and a synchronization signal synchronous with the electric trigger signal.

The light pulse output from the laser light source 21 is introduced onto the sample 40, exciting fluorescent matter contained in the sample 40. The fluorescent light to be measured that is generated by the excited fluorescent matter is focused by the optical system 41 and introduced onto the photocathode 11 of the streak tube 10.

The frequency synthesizer 35 receives the synchronization signal output from the laser light source 21, and outputs a synchronization scan trigger signal at a high frequency in synchronism with the synchronization signal. The synchronization scan sweeping unit 17 generates a synchronization scan sweeping signal based on the synchronization scan trigger signal. The synchronization scan sweeping signal is applied to the vertical deflection plates 15 of the streak tube 10.

The electric trigger signal is output from the laser light source 21 and applied to the timing generator 33, which outputs an electric pulse signal of a predetermined duration of time, synchronous to the timing at which light to be measured is introduced onto the photocathode 11. The horizontal blanking signal generator 18 outputs a horizontal blanking signal based on this electric pulse signal output from the timing generator 33, which horizontal blanking signal is applied to the horizontal deflection plates 16 in the streak tube 10. The synchronization scan sweeping signal and horizontal blanking signal are exactly the same as described in the first embodiment.

While several embodiments of the present invention have been described in detail, those skilled in the art will recognize that there are many possible modifications and variations which may be made in these embodiments while yet retaining many of the novel features and advantages of the invention. For example, the pulse selector 31 and laser light source 21 could be capable of variably setting the repetition frequency of the light pulse to suit the life of the fluorescent light output from the sample 40.

The period in which the horizontal blanking signal is at the lower level $V_{H1}$ need not be limited to a time period including the beginning period in which the light to be measured is applied to the photocathode 11, but can be set to elapse for a fixed time. However, it is important in this case that only one streak image can be formed on the phosphor screen 14 for each pulse of the horizontal blanking signal.

In the synchronization scan sweeping methods described above, the sweeping signal applied to the vertical deflection plates 15 has a sinusoidal waveform. However, the sweeping signal of the present invention is not limited to a sinusoidal waveform, but may have another waveform, such as a trapezoidal waveform or a saw-tooth waveform.

What is claimed is:

1. A sweeping method for a streak camera system that includes a streak camera having an air-tight cylindrical container having a longitudinal axis, a photocathode that receives a light to be measured and generates an electron beam into the air-tight cylindrical container, and an output member disposed in spaced apart relation with the photocathode and having an output effective area for receiving the electron beam; a first deflection unit that generates an electrical field in a first direction substantially perpendicular to a direction in which the longitudinal axis extends; and a second deflection unit that generates an electric field in a second direction substantially perpendicular to both the first direction and the direction in which the longitudinal axis extends, the method comprising the steps of:

applying a sweeping signal to said first deflection unit to deflect the electron beam back and forth in the first direction, the sweeping signal having a predetermined frequency and a period determined by the predetermined frequency; and applying a blanking signal to said second deflection unit to deflect the electron beam back and forth in the second direction, the blanking signal having a period equal to a multiple times the period of the sweeping signal and being applied during a period of time at which the light to be measured is incident upon the photocathode, the blanking signal causing the electron beam to scan across the output effective area of said output member only once during one period of the blanking signal.

2. The sweeping method according to claim 1, wherein the blanking signal has a first level and a second level lower different from the first level, and when the blanking signal is at the second level, the electron beam scans across the output effective area of said output member, and wherein a duration of the second level of the blanking signal is substantially equal to a half of the period of the sweeping signal.

3. The sweeping method according to claim 2, wherein when the blanking signal is at the second level, the sweeping signal changes substantially linearly from a first amplitude to a second amplitude.

4. The sweeping method according to claim 1, wherein the period of time at which the light to be measured is incident upon the photocathode is substantially equal to a half of the period of the sweeping signal.

5. The sweeping method according to claim 1, wherein applying the sweeping signal comprises the steps of outputting a first trigger signal generated by photo-electrically converting light pulses having a predetermined repetition frequency, and generating the sweeping signal in synchronism with the first trigger signal, and wherein applying the blanking signal comprises the steps of extracting the light pulses at a predetermined interval, outputting a second trigger signal representative of timings at which extracted light pulses are output, and generating the blanking signal in synchronism with the second trigger signal.

6. The sweeping method according to claim 5, further comprising the steps of irradiating the extracted light pulses onto a sample, and introducing a light emitted from the sample according to irradiation of the extracted light pulses onto the photocathode.

7. The sweeping method according to claim 1, wherein applying the sweeping signal comprises the step of generating the sweeping signal in synchronism with a first trigger signal, the first trigger signal being output in synchronism with light pulses having a predetermined repetition frequency, and wherein applying the blanking signal comprises the steps of extracting the light pulses at a predetermined interval, outputting a second trigger signal representative of timings at which extracted light pulses are output, and generating the blanking signal in synchronism with the second trigger signal.

8. The sweeping method according to claim 7, further comprising the steps of irradiating the extracted light pulses onto a sample, and introducing a light emitted from the sample according to irradiation of the extracted light pulses onto the photocathode.

9. The sweeping method according to claim 1, wherein applying the sweeping signal comprises the steps of frequency multiplying a first trigger signal having a first frequency, generating a second trigger signal having a second frequency equal to the predetermined frequency of the sweeping signal, the first trigger signal being output in synchronism with light pulses having a frequency equal to the first frequency, and generating the sweeping signal in synchronism with the second trigger signal, and wherein applying the blanking signal comprises the step of generating the blanking signal in synchronism with the first trigger signal.

10. The sweeping method according to claim 9, further comprising the steps of irradiating light pulses onto a sample, and introducing a light emitted from the sample according to irradiation of the light pulses onto the photocathode.

11. The sweeping method according to claim 1, wherein applying the sweeping signal comprises the steps of generating a first trigger signal having a first frequency based on a second trigger signal having a second frequency lower than the first frequency, the second trigger signal being output in synchronism with light pulses having a predetermined repetition frequency, and generating the sweeping signal in synchronism with the first trigger signal, and wherein applying the blanking signal comprises the step of generating the blanking signal in synchronism with the first trigger signal.

12. The sweeping method according to claim 11, further comprising the steps of irradiating the light pulses onto a sample, and introducing a light emitted from the sample according to irradiation of the light pulses onto the photocathode.

13. A streak camera system comprising:

a streak camera having an air-tight cylindrical container having a longitudinal axis, a photocathode that receives a light to be measured and generates an electron beam into the air-tight cylindrical container, and an output member disposed in spaced apart relation with the photocathode and having an output effective area for receiving the electron beam;

a first deflection unit that generates an electrical field in a first direction substantially perpendicular to a direction in which the longitudinal axis extends;

a second deflection unit that generates an electric field in a second direction substantially perpendicular to both the first direction and the direction in which the longitudinal axis extends;

sweeping means for applying a sweeping signal to said first deflection unit to deflect the electron beam back and forth in the first direction, the sweeping signal having a predetermined frequency and a period determined by the predetermined frequency; and blanking means for applying a blanking signal to said second deflection unit to deflect the electron beam back and forth in the second direction, the blanking signal having a period equal to a multiple times the period of the sweeping signal and being applied during a period of time at which the light to be measured is incident upon the photocathode, the blanking signal causing the electron beam to scan across the output effective area of said output member only once during one period of the blanking signal.

14. The streak camera system according to claim 13, wherein the blanking signal has a first level and a second level lower different from the first level, and when the blanking signal is at the second level, the electron beam scans across the output effective area of said output member, and wherein a duration of the second level of the blanking signal is substantially equal to a half of the period of the sweeping signal.

15. The streak camera system according to claim 14, wherein when the blanking signal is at the second level, the sweeping signal changes substantially linearly from a first amplitude to a second amplitude.

16. The streak camera system according to claim 13, wherein the period of time at which the light to be measured is incident upon the photocathode is substantially equal to a half of the period of the sweeping signal.

17. The streak camera system according to claim 13, wherein said sweeping means comprises a light trigger unit that outputs a first trigger signal generated by photo-electrically converting light pulses having a predetermined repetition frequency, and a sweeping unit that generates the sweeping signal in synchronism with the first trigger signal, and wherein said blanking means comprises light pulse extracting means for extracting the light pulses at a predetermined interval and outputting a second trigger signal representative of timings at which extracted light pulses are output, and a blanking signal generating unit that generates the blanking signal in synchronism with the second trigger signal.

18. The streak camera system according to claim 17, wherein the extracted light pulses are irradiated onto a sample and a light emitted from the sample according to irradiation of the extracted light pulses is incident upon the photocathode.

19. The streak camera system according to claim 13, wherein said sweeping means comprises a sweeping unit that generates the sweeping signal in synchronism with a first trigger signal, the first trigger signal being output in synchronism with light pulses having a predetermined repetition frequency, and wherein said blanking means comprises light pulse extracting means for extracting the light pulses at a predetermined interval and outputting a second trigger signal representative of timings at which extracted light pulses are output, and a blanking signal generating unit that generates the blanking signal in synchronism with the second trigger signal.

20. The streak camera system according to claim 19, wherein the extracted light pulses are irradiated onto a sample and a light emitted from the sample according to irradiation of the extracted light pulses is incident upon the photocathode.

21. The streak camera system according to claim 13, wherein said sweeping means comprises a frequency multiplier that frequency multiplies a first trigger signal having a first frequency and generates a second trigger signal having a second frequency equal to the predetermined frequency of the sweeping signal, the first trigger signal being output in synchronism with light pulses having a frequency equal to the first frequency, and a sweeping unit that generates the sweeping signal in synchronism with the second trigger signal, and wherein said blanking means comprises a blanking signal generating unit that generates the blanking signal in synchronism with the first trigger signal.

22. The streak camera system according to claim 21, wherein the light pulses are irradiated onto a sample and a light emitted from the sample according to irradiation of the light pulses is incident upon the photocathode.

23. The streak camera system according to claim 13, wherein said sweeping means comprises a frequency synthesizer that generates a first trigger signal having a first frequency based on a second trigger signal having a second frequency lower than the first frequency, the second trigger signal being output in synchronism with light pulses having a predetermined repetition frequency, and a sweeping unit that generates the sweeping signal in synchronism with the first trigger signal, and wherein said blanking means comprises a blanking signal generating unit that generates the blanking signal in synchronism with the first trigger signal.

24. The streak camera system according to claim 23, wherein the light pulses are irradiated onto a sample and a light emitted from the sample according to irradiation of the light pulses is incident upon the photocathode.

* * * * *